United States Patent
Hung

(10) Patent No.: US 7,800,897 B2
(45) Date of Patent: Sep. 21, 2010

(54) LIGHT DOCKING STATION APPLIED TO A PORTABLE ELECTRONIC DEVICE

(75) Inventor: Cheng-Shen Hung, Taipei (TW)

(73) Assignee: Amtek System Co., Ltd., Taipei Hsien (TW)

( * ) Notice: Subject to any disclaimer, the term of this patent is extended or adjusted under 35 U.S.C. 154(b) by 70 days.

(21) Appl. No.: 12/211,152

(22) Filed: Sep. 16, 2008

(65) Prior Publication Data

US 2010/0067189 A1    Mar. 18, 2010

(51) Int. Cl.
*H05K 5/00* (2006.01)
*H05K 7/00* (2006.01)

(52) U.S. Cl. .............................. 361/679.41; 361/679.43

(58) Field of Classification Search ............ 361/679.41, 361/679.43
See application file for complete search history.

(56) References Cited

U.S. PATENT DOCUMENTS 5,504,648 A * 4/1996 Honda et al. ........... 361/679.43
6,152,414 A * 11/2000 Jondrow ................. 248/346.03
2007/0070598 A1* 3/2007 Chuang ...................... 361/686

* cited by examiner

*Primary Examiner*—Jayprakash N Gandhi
*Assistant Examiner*—Anthony M Haughton
(74) *Attorney, Agent, or Firm*—Kile Goekjian Reed & McManus PLL

(57) ABSTRACT

A light docking station applied to at least one portable electronic device, including: a bottom board module, a casing module, a circuit module, a first input/output module, a second input/output module, and a retaining module. The casing module has a casing mating with the bottom board module. The circuit module is disposed inside the casing of the casing module. The first input/output module is disposed on the casing of the casing module and electrically connected between the circuit module and a plurality of different peripherals. The second input/output module is disposed on the casing of the casing module and electrically connected between the circuit module and an external connector of the portable electronic device. The retaining module is disposed on a top side of the casing in order to mate with two retaining grooves that are disposed on a bottom side of the portable electronic device.

9 Claims, 9 Drawing Sheets

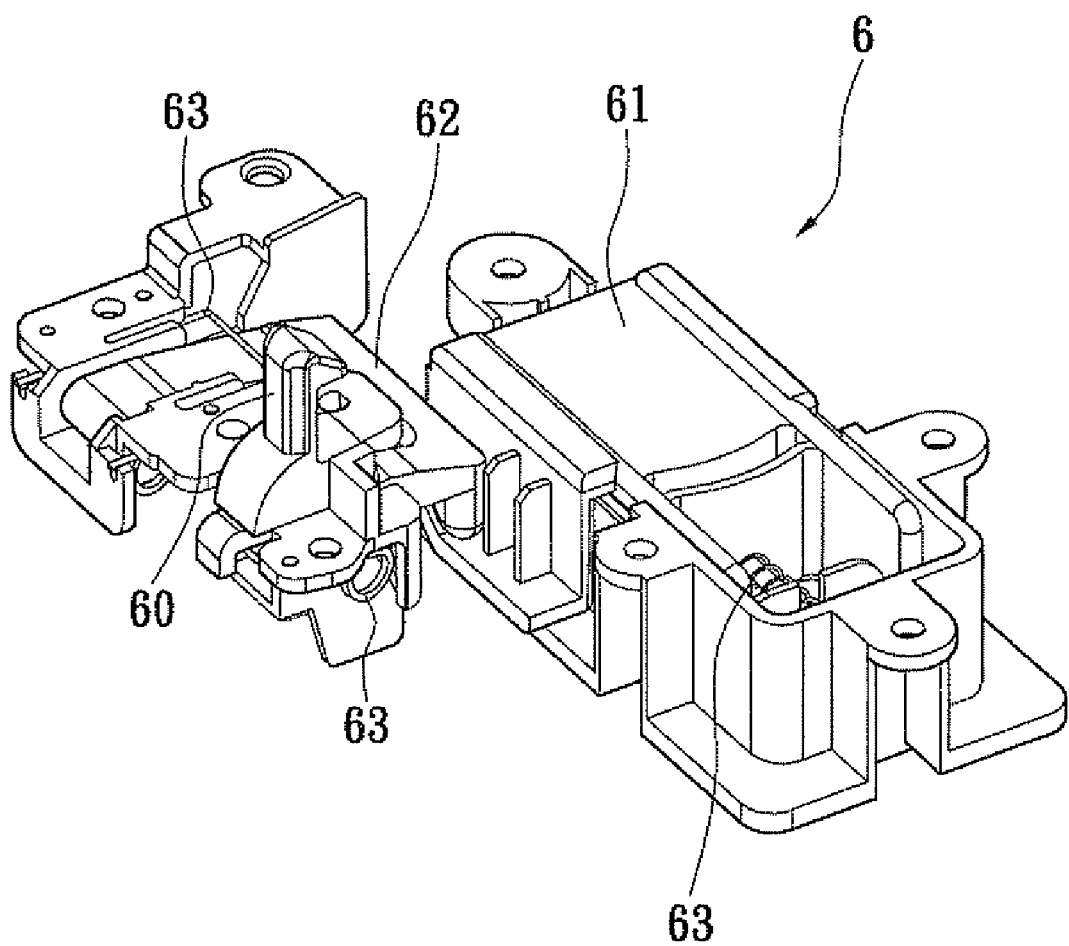
FIG. 3A1

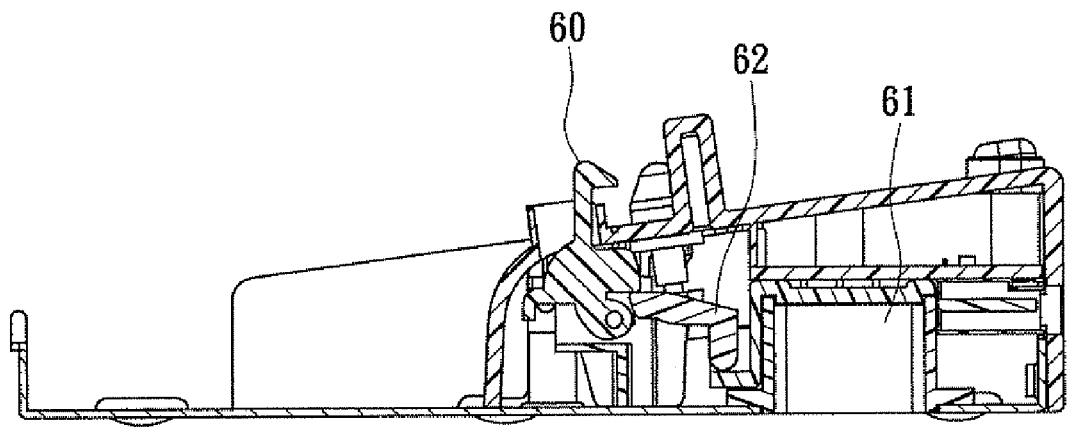
FIG. 3A2
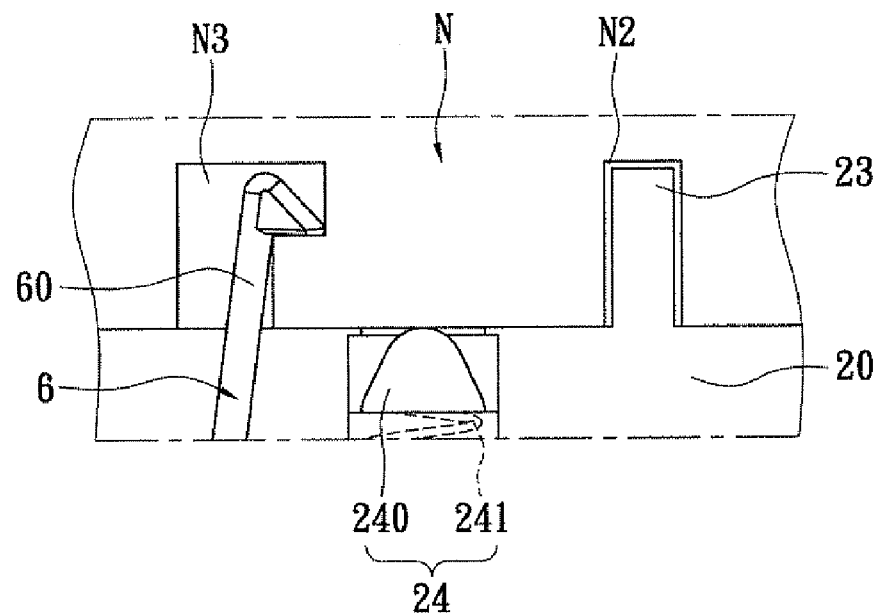
FIG. 3A3

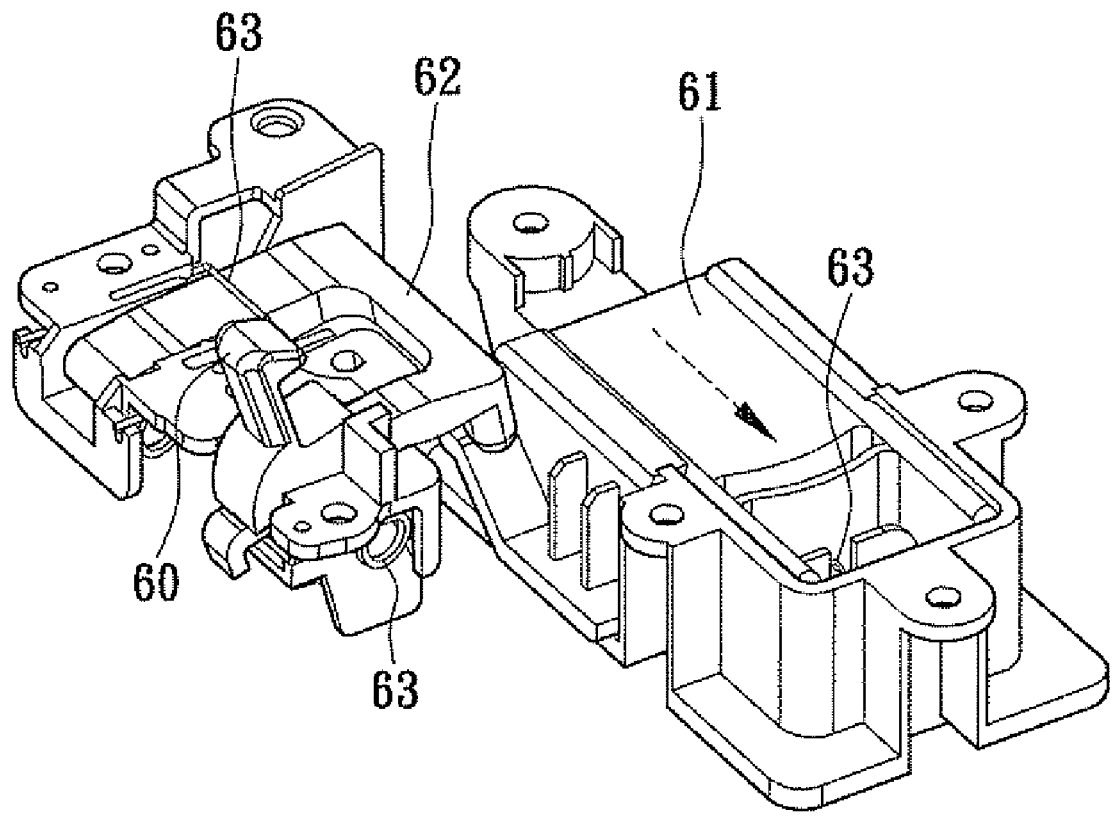
FIG. 3B1

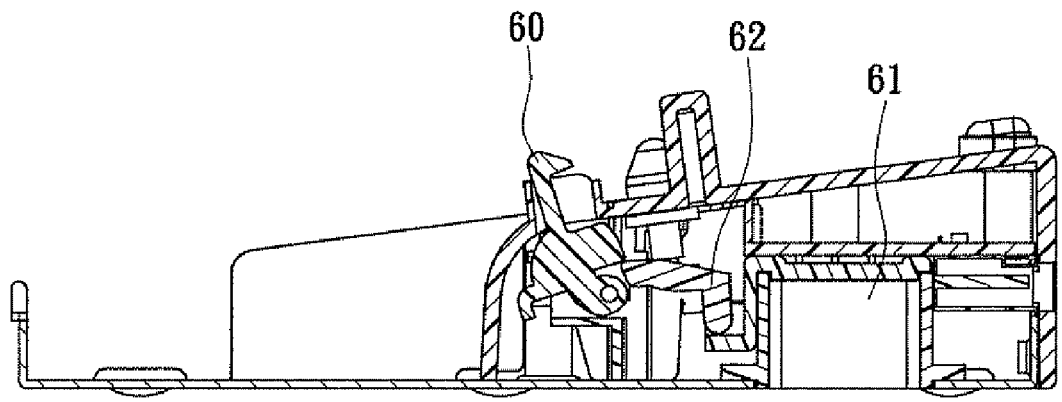
FIG. 3B2
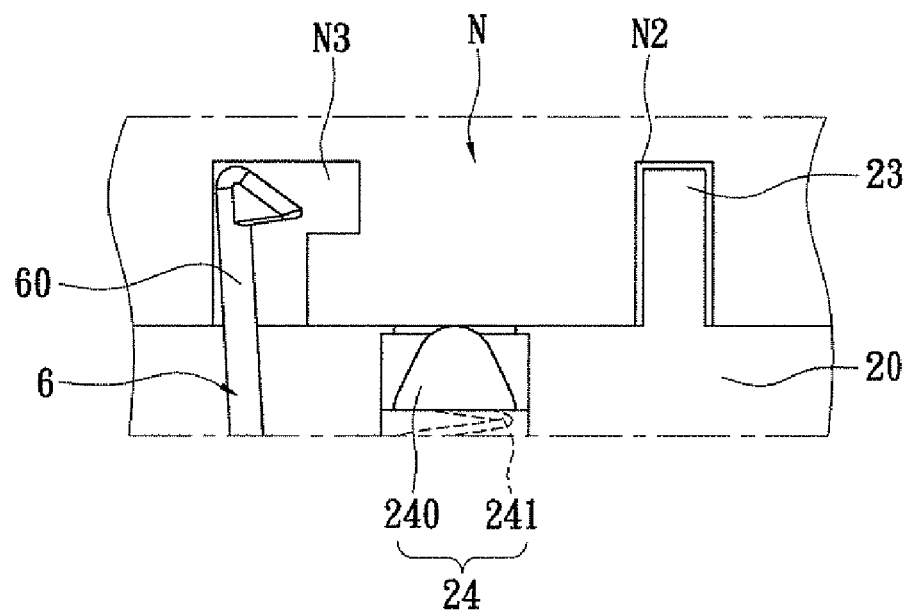
FIG. 3B3

LIGHT DOCKING STATION APPLIED TO A PORTABLE ELECTRONIC DEVICE

BACKGROUND OF THE INVENTION

1. Field of the Invention

The present invention relates to a light docking station, and particularly relates to a light docking station applied to at least one portable electronic device.

2. Description of the Related Art

Under the prevailing design trend that demands lean and light design, the size of notebook computers is reduced constantly. However, some mechanisms and elements have size limitations to keep the notebook computer functional. In order to shrink the size of the notebook computer and maintain the function same as the desktop computer, a docking station has been developed.

The docking station includes connection ports conforming to a plurality of interface specifications, such as a Universal Serial Bus (USB), a PS/2 port, IEEE1394, a parallel port, a serial port, an Ethernet port (RJ-45) and optical disk, and the like. By separating the design of the docking station and the notebook computer, the weight and size of the notebook computer may be greatly reduced. When there is a need to connect to peripheral devices, mount the notebook computer on the docking station, the peripheral devices may be connected to perform data transmission or the notebook computer may be charged.

However, it is inconvenient for user to carry the docking station of the prior art due to the large size of the docking station. In addition, the docking station of the prior art has a pressing body on its top side for maintaining the contact between the docking station and the notebook computer. However, because the docking station of the prior art is disposed on its top side, anyone can walk off with the notebook computer easily. Hence, the docking station of the prior art does not provide protection against theft.

SUMMARY OF THE INVENTION

One particular aspect of the present invention is to provide a light docking station applied to at least one portable electronic device. The feature of the light docking station of the present invention includes simple structure and small size, so that it is convenient for a user to carry the light docking station. In addition, the two pressing bodies are hidden under the casing in order to enhance the aspect of the light docking station of the present invention. Moreover, when the user wants to press the two pressing bodies together, the light docking station of the present invention needs to be inverted in order to provide protection against theft. For example, when the light docking station of the present invention is inverted, the action of inverting the light docking station comes into other people notice in order to provide protection against theft.

In order to achieve the above-mentioned aspects, the present invention provides a light docking station applied to at least one portable electronic device, including: a bottom board module, a casing module, a circuit module, a first input/output module, a second input/output module, and a retaining module. The casing module has a casing mating with the bottom board module. The circuit module is disposed inside the casing of the casing module. The first input/output module is disposed on the casing of the casing module and electrically connected between the circuit module and a plurality of different peripherals. The second input/output module is disposed on the casing of the casing module and electrically connected between the circuit module and an external connector of the portable electronic device. The retaining module is disposed on a top side of the casing in order to mate with two retaining grooves that are disposed on a bottom side of the portable electronic device.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which:

FIG. 3A1 is a perspective, assembled view of a retaining module of a light docking station of the present invention (before moving a retaining module);

FIG. 3A2 is a lateral, assembled view of a retaining module of a light docking station of the present invention (before moving a retaining module);

FIG. 3A3 is a lateral, schematic view of a retaining module of a light docking station mated with a portable electronic device (before moving a retaining module) according to the present invention;

FIG. 3B1 is a perspective, assembled view of a retaining module of a light docking station of the present invention (after moving a retaining module);

FIG. 3B2 is a lateral, assembled view of a retaining module of a light docking station of the present invention (after moving a retaining module);

FIG. 3B3 is a lateral, schematic view of a retaining module of a light docking station mated with a portable electronic device (after moving a retaining module) according to the present invention.

DETAILED DESCRIPTION OF THE PREFERRED EMBODIMENTS

Figure 1:
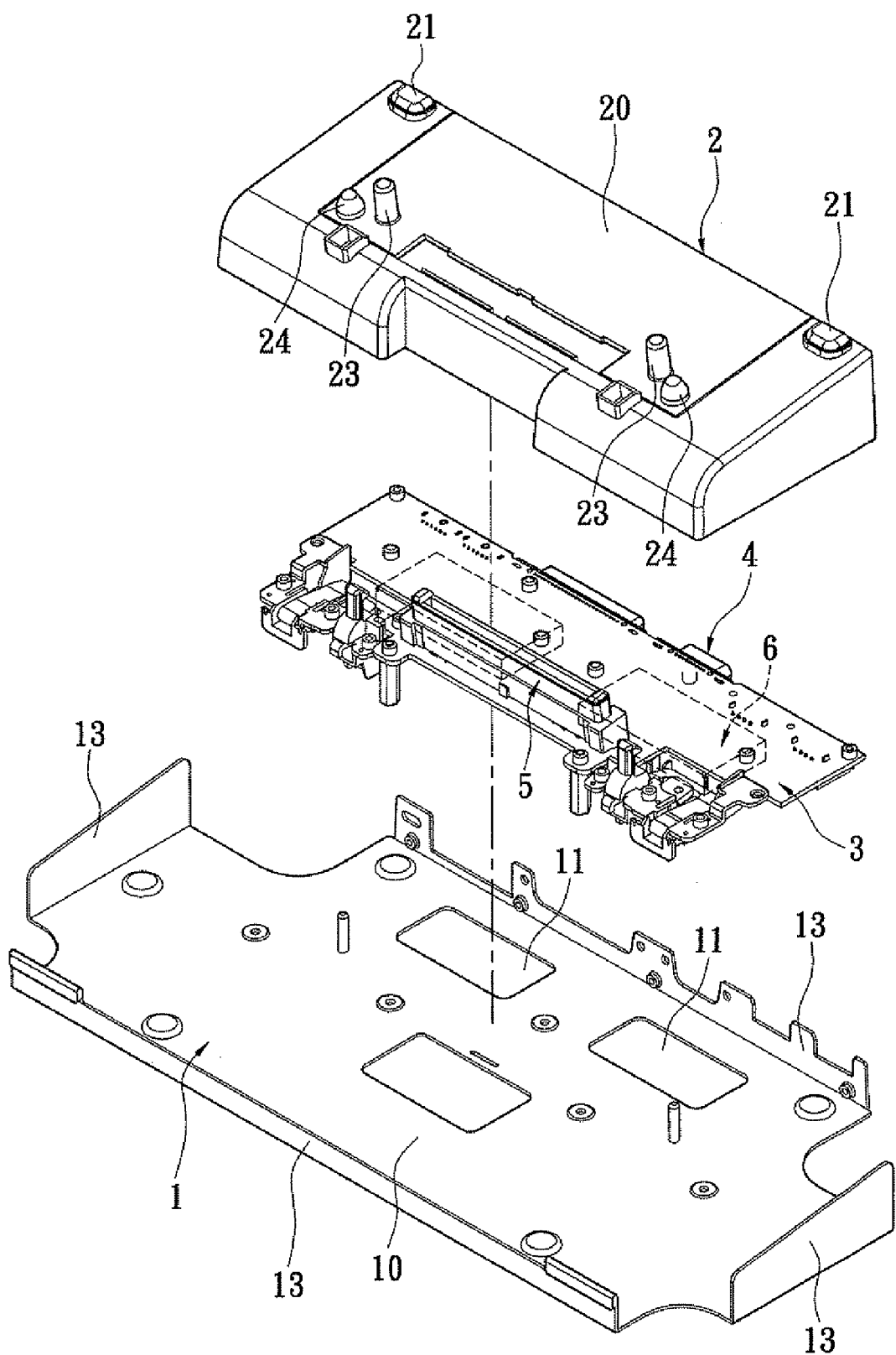
FIG. 1 is a perspective, exploded view of a light docking station applied to at least one portable electronic device of the present invention.
Figure 2A:
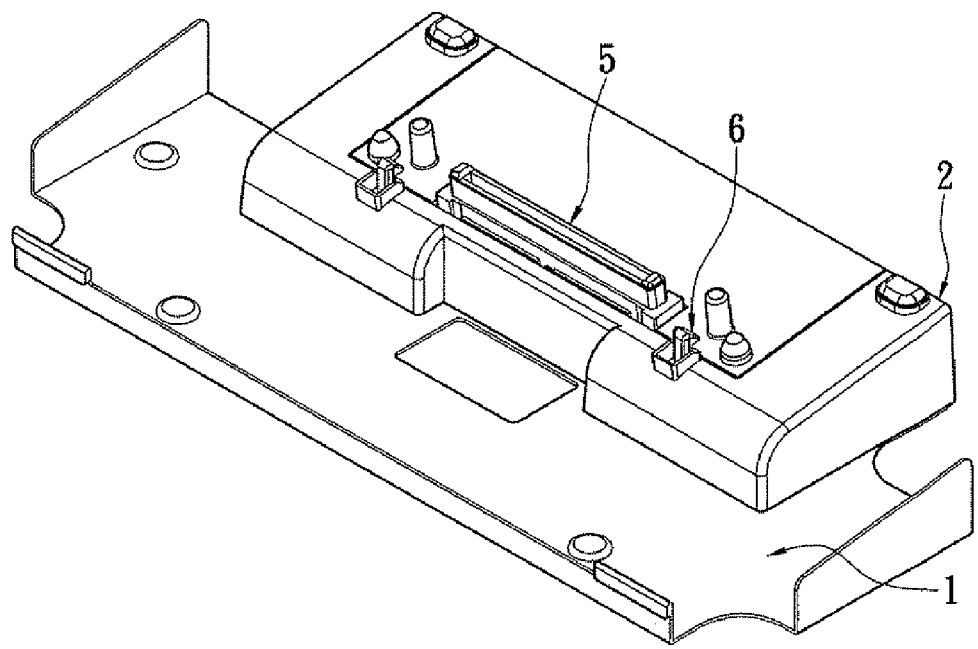
FIG. 2A is a first perspective, assembled view of a light docking station applied to at least one portable electronic device of the present invention.

Referring to FIGS. 1 and 2A, the present invention provides a light docking station applied to at least one portable electronic device, including: a bottom board module 1, a casing module 2, a circuit module 3, a first input/output module 4, a second input/output module 5, and a retaining module 6.

Figure 2B:
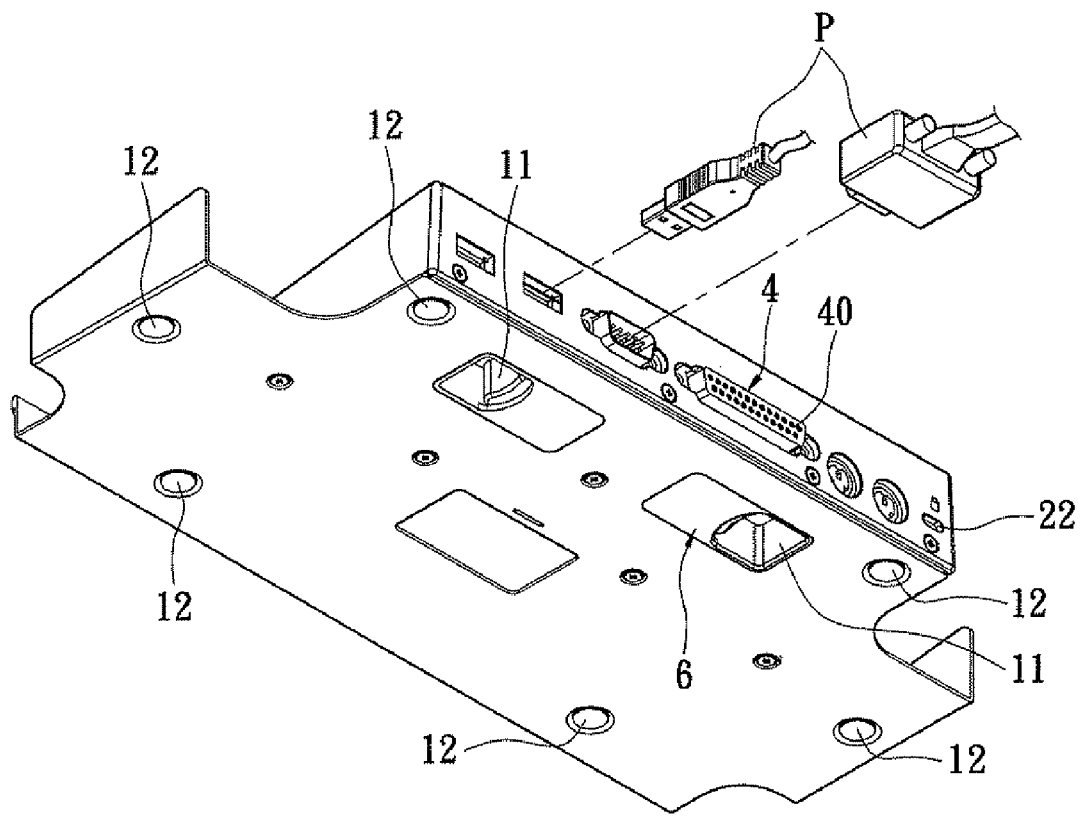
FIG. 2B is a second perspective, assembled view of a light docking station applied to at least one portable electronic device of the present invention.

The bottom board module 1 has a plane portion 10, two openings 11 passing through the plane portion 10, a plurality of elastic portions 12 disposed on a bottom side of the plane portion 10 (as shown in FIG. 2B), and four support portions 13 bent upwards from four sides of the plane portion 10.

The casing module 2 has a casing 20, at least two elastic pads 21, a lock hole 22 (as shown in FIG. 2B), at least two positioned protrusions 23 and an elastic module 24. In addition, the two elastic pads 21 are disposed on the top side of the casing 20. The lock hole 22 is disposed on the rear side of the casing 20. The two positioned protrusions 23 are disposed on the top side of the casing 20, and the elastic module 24 is disposed on the top side of the casing 20.

Furthermore, the circuit module 3 is disposed inside the casing 20 of the casing module 2, and the circuit module 3 is used as an electrical interface between the first input/output module 4 and the second input/output module 5.

Referring to FIG. 23, the first input/output module 4 is disposed on a rear side of the casing 20 of the casing module 2 and electrically connected between the circuit module 3 and a plurality of different peripherals P. In the present invention, the first input/output module 4 has a plurality of ports 40 electrically mated with the different peripherals P.

Figure 2C:
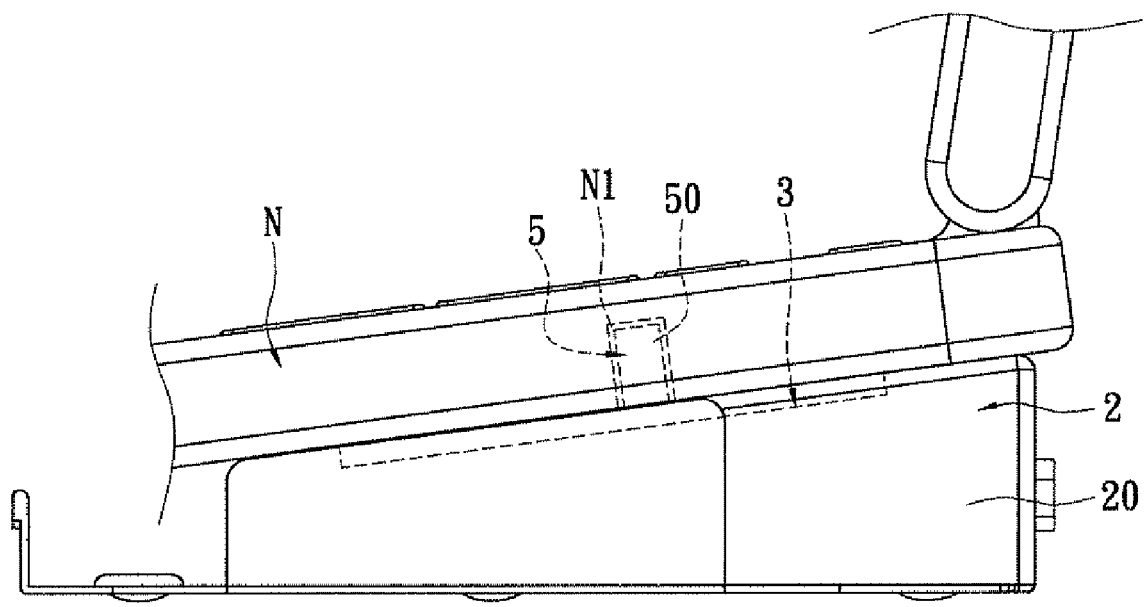
FIG. 2C is a lateral assembled view of a light docking station applied to at least one portable electronic device of the present invention.

Referring to FIG. 2C, the second input/output module 5 is disposed on the top side of the casing 20 of the casing module 2 and electrically connected between the circuit module 3 and an external connector N1 of the portable electronic device N. In the present invention, the second input/output module 5 is an electrical connector 50 electrically mated with the external connector N1 of the portable electronic device N.

Referring to FIGS. 3A3, 3B3 and 3C, the two positioned protrusions 23 are respectively mated with two positioned grooves N2 that are disposed on a bottom side of the portable electronic device N in order to position the portable electronic device N on the top side of the casing 20.

Moreover, the elastic module 24 includes at least two movable protrusions 240 and at least two elastic elements 241 respectively disposed under the movable protrusions 240 in order to respectively push upwards the two movable protrusions 240. One part of each movable protrusion 240 is only exposed outside the top side of the casing 20 due to the limitation of the casing 20.

Furthermore, the retaining module 6 mates with two retaining grooves N3 that are disposed on a bottom side of the portable electronic device N. In addition, the retaining module 6 includes: two movable retaining bodies 60 projected from the top side of the casing 20 in order to respectively mate with the two retaining grooves N3, two pressing bodies 61 respectively disposed on the bottom side of the casing 20, two joint mechanisms 62 respectively disposed between the two movable retaining bodies 60 and the two pressing bodies 61, and a plurality of elastic bodies 63 for making the two movable retaining bodies 60, the two pressing bodies 61 and the two joint mechanisms 62 return to their original positions. In addition, the two pressing bodies 61 are respectively exposed by the two openings 11 of the bottom board module 1.

Figure 3:
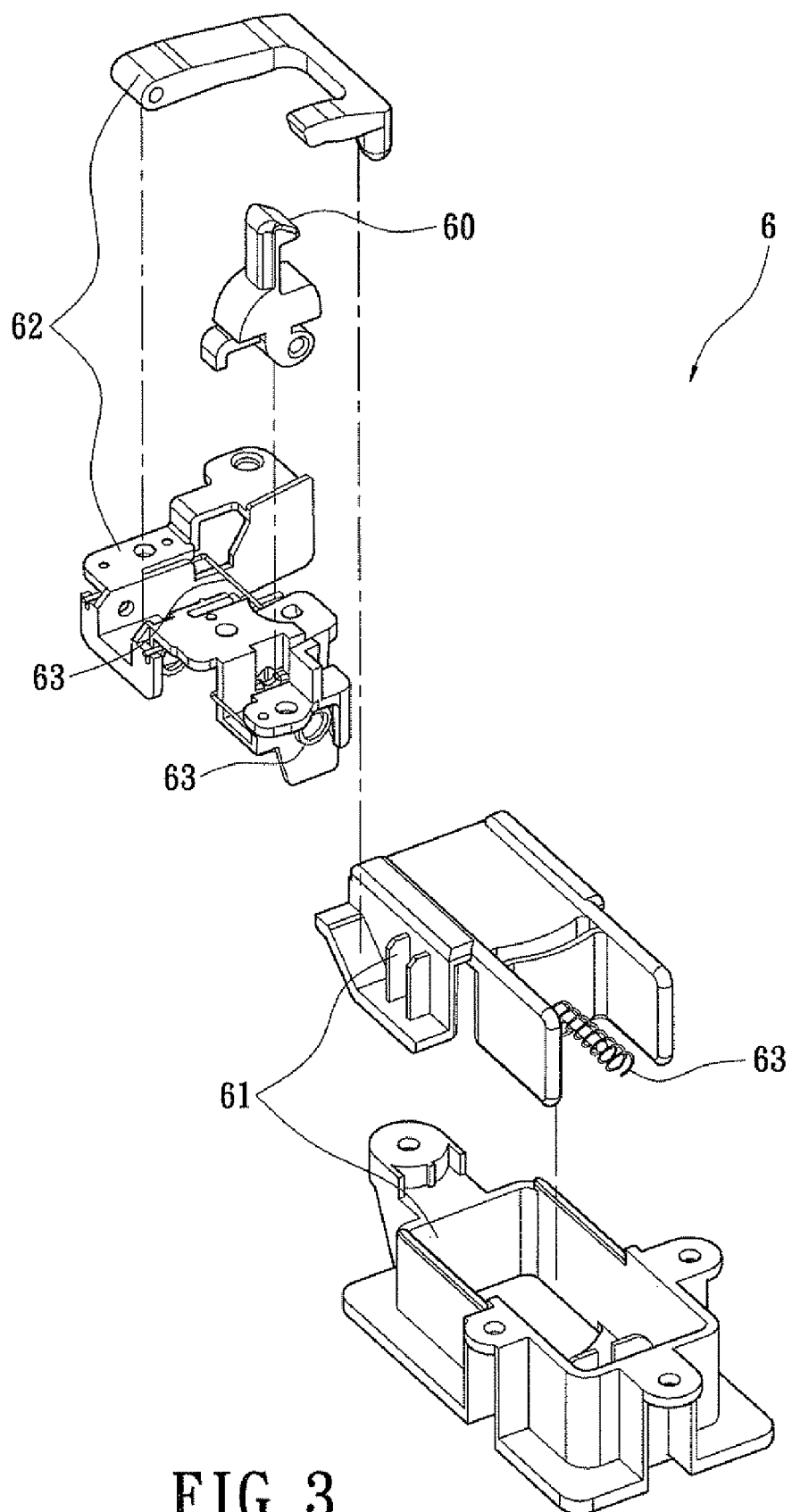
FIG. 3 is a perspective, exploded view of a retaining module of a light docking station of the present invention.
Figure 3C:
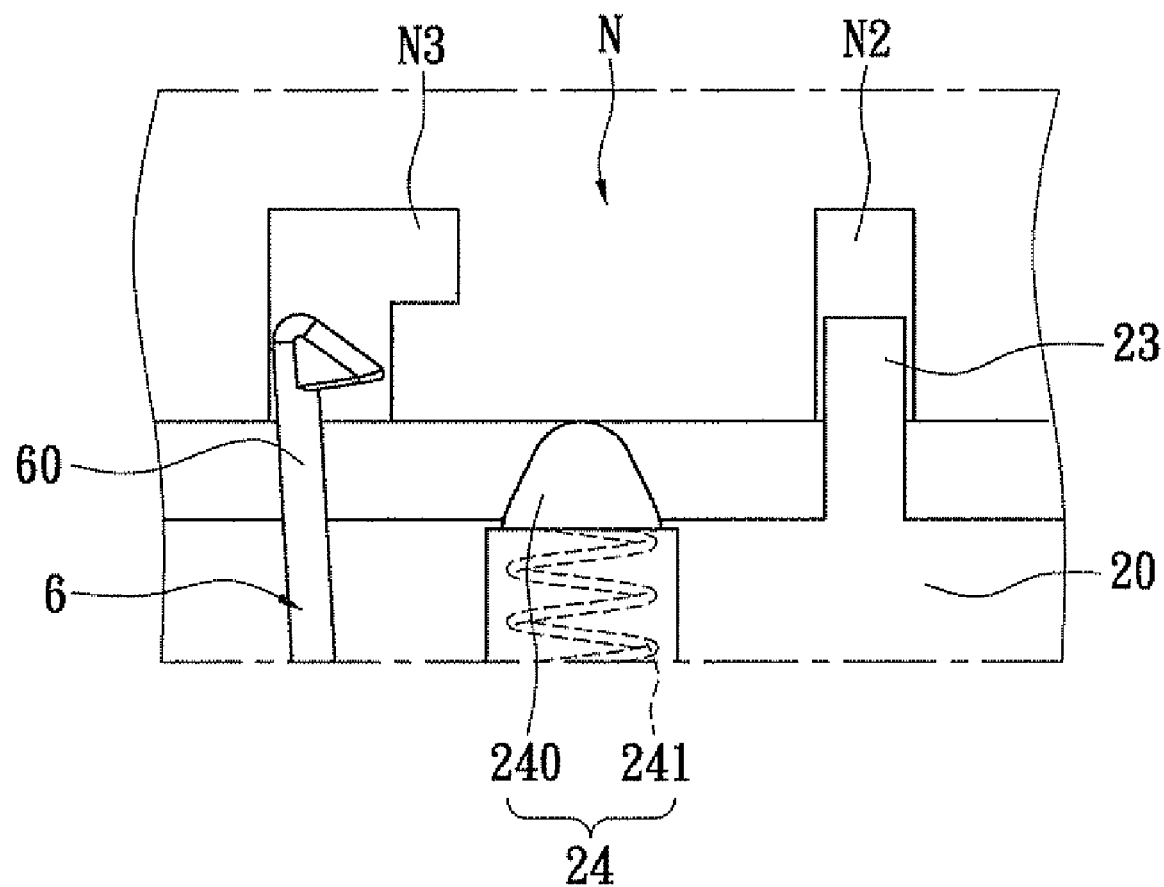
FIG. 3C is a lateral, schematic view of a portable electronic device separated from a light docking station (after an elastic module is projected outwards) according to the present invention.

Referring to FIGS. 3A3 and 3B3, when the two pressing bodies 61 are pressed, the two joint mechanisms 62 are respectively driven by the two pressing bodies 61 in order to separate the two movable retaining bodies 60 from the two retaining grooves N3. At the same time, referring to FIG. 3C, the portable electronic device N is moved upwards due to the elastic force generated by the elastic elements 241 of the elastic module 24. Hence, it is easy for a user to carry the portable electronic device N.

In conclusion, the feature of the light docking station of the present invention includes simple structure and small size, so that it is convenient for a user to carry the light docking station. In addition, the two pressing bodies are hidden under the casing in order to enhance the aspect of the light docking station of the present invention. Moreover, when the user wants to press the two pressing bodies together, the light docking station of the present invention needs to be inverted in order to provide protection against theft. For example, when the light docking station of the present invention is inverted, the action of inverting the light docking station comes into other people notice in order to provide protection against theft.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light docking station applied to at least one portable electronic device, comprising:
   a bottom board module;
   a casing module having a casing mating with the bottom board module;
   a circuit module disposed inside the casing of the casing module;
   a first input/output module disposed on the casing of the casing module and electrically connected between the circuit module and a plurality of different peripherals;
   a second input/output module disposed on the casing of the casing module and electrically connected between the circuit module and an external connector of the portable electronic device; and
   a retaining module disposed in the casing module;
   wherein the retaining module has two movable retaining bodies, two pressing bodies, two joint mechanisms and a plurality of elastic bodies; wherein the two joint mechanisms are connected between the two movable retaining bodies and the two pressing bodies, respectively;
   wherein the two movable retaining bodies are protruded outside of the casing of the casing module in order to respectively mate with two retaining grooves that are formed on a bottom side of the portable electronic device;
   wherein the bottom board module has two openings in order to respectively expose the two pressing bodies;
   wherein when the portable electronic device is disconnected from the light docking station, the two joint mechanisms are respectively driven by pushing the two pressing bodies such that the two movable retaining bodies connected with the two joint mechanism are respectively separated from the two retaining grooves of the portable electronic device; and
   wherein the elastic bodies apply an elastic force to the portable electronic device, when the portable electronic device is disconnected from the light docking station, the portable electronic device is pushed upward by the elastic force such that two movable retaining bodies, the two pressing bodies and the two joint mechanisms are returned to an original status.

2. The light docking station as claimed in claim 1, wherein the first input/output module is disposed on a rear side of the casing, and the first input/output module has a plurality of ports electrically mated with the different peripherals.

3. The light docking station as claimed in claim 1, wherein the second input/output module is disposed on the top side of the casing, and the second input/output module is an electrical connector electrically mated with the external connector of the portable electronic device.

4. The light docking station as claimed in claim 1, wherein the casing module further comprises: at least two positioned protrusions disposed on the top side of the casing, and the two positioned protrusions are respectively mated with two positioned grooves that are disposed on a bottom side of the portable electronic device in order to position the portable electronic device on the top side of the casing.

5. The light docking station as claimed in claim 1, further comprising: an elastic module disposed on the top side of the casing in order to push upwards the portable electronic device.

6. The light docking station as claimed in claim 5, wherein the elastic module includes at least two movable protrusions and at least two elastic elements respectively disposed under the movable protrusions in order to respectively push upwards the two movable protrusions, and one part of each movable protrusion is only exposed outside the top side of the casing due to the limitation of the casing.

7. The light docking station as claimed in claim 1, wherein the casing module further comprises at least two elastic pads disposed on the top side of the casing.

8. The light docking station as claimed in claim 1, wherein the casing module further comprises a lock hole disposed on the rear side of the casing.

9. The light docking station as claimed in claim 1, wherein the bottom board module has a plane portion, a plurality of elastic portions disposed on a bottom side of the plane portion, and four support portions bent upwards from four sides of the plane portion.

* * * * *